US007042841B2

(12) United States Patent
Abdelilah et al.

(10) Patent No.: US 7,042,841 B2
(45) Date of Patent: May 9, 2006

(54) CONTROLLING NETWORK CONGESTION USING A BIASED PACKET DISCARD POLICY FOR CONGESTION CONTROL AND ENCODED SESSION PACKETS: METHODS, SYSTEMS, AND PROGRAM PRODUCTS

(75) Inventors: Youssef Abdelilah, Holly Springs, NC (US); Gordon Taylor Davis, Chapel Hill, NC (US); Jeffrey Haskell Derby, Chapel Hill, NC (US); Dongming Hwang, Cary, NC (US); Clark Debs Jeffries, Durham, NC (US); Malcolm Scott Ware, Raleigh, NC (US); Hua Ye, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1044 days.

(21) Appl. No.: 09/906,499

(22) Filed: Jul. 16, 2001

(65) Prior Publication Data

US 2003/0012137 A1    Jan. 16, 2003

(51) Int. Cl.
*H04L 12/26* (2006.01)
(52) U.S. Cl. ...................... 370/229; 370/401
(58) Field of Classification Search ............... 370/229, 370/230, 230.1, 232, 235, 328, 338, 352, 370/401, 393, 410
See application file for complete search history.

(56) References Cited

U.S. PATENT DOCUMENTS

| | | | |
|---|---|---|---|
| 5,231,633 A | 7/1993 | Hluchyj et al. | 370/94.1 |
| 5,253,326 A | 10/1993 | Yong | 395/2 |
| 5,444,706 A | 8/1995 | Osaki | 370/94.1 |
| 5,633,861 A | 5/1997 | Hanson et al. | 370/232 |
| 5,764,641 A | 6/1998 | Lin | 370/412 |
| 6,044,079 A | 3/2000 | Calvignac et al. | 370/395 |

(Continued)

OTHER PUBLICATIONS

Appln. Ser. No. 09/448190, filed Nov. 23, 1999; now U.S. Patent No. 6724776 Issued Apr. 20, 2004 (RAL 919990136US1).

(Continued)

*Primary Examiner*—Chi Pham
*Assistant Examiner*—Alexander O. Boakye
(74) *Attorney, Agent, or Firm*—Joscelyn G. Cockburn (57) ABSTRACT

A packet network congestion control system using a biased packet discard policy includes a plurality of end points having codecs operating in a framework, e.g. ITU-T H.323 protocol to establish a communication session. The protocol enables the codecs to negotiate codec type and associated parameters. Once a connection and session are established, compressed voice and data packets start flowing between the two end points. A control entity supplies congestion control packets periodically. The control packets provide a "heartbeat" signal to the codec at the other end of the session. Each codec receiver uses the "heartbeat" signal as an indication of network congestion. As network congestion increases, routers within the network discard excess packets to prevent network failure. The network discards all packets classified as congestion control packets whenever a flow control mechanism detects congestion or a trend toward congestion. As packets are discarded, the end points renegotiate codec type and/or parameters to realize lower bit rates.

36 Claims, 3 Drawing Sheets

U.S. PATENT DOCUMENTS

| | | | |
|---|---|---|---|
| 6,069,872 A | 5/2000 | Bonomi et al. | 370/236 |
| 6,081,504 A | 6/2000 | Tanaka et al. | 370/230 |
| 6,219,339 B1 * | 4/2001 | Doshi et al. | 370/235 |
| 6,680,922 B1 * | 1/2004 | Jorgensen | 370/328 |

OTHER PUBLICATIONS

Appln. Ser. No. 09/448380, filed Nov. 23, 1999; now U.S. Patent No. 6771652 Issued Aug. 3, 2004 (RAL919990098US1).

Appln. Ser. No. 09/906406 entitled "Codec With Network Congestion Detection And Automatic Fallback: Methods, Systems & Program Products" filed Jul. 16, 2001, RAL920000088US1/1963-7412.

Nuggehally S. Jayant P. Noll, "*Digital Coding of Waveforms: Principles and Applications to Speech and Video*", Prentice Hall, Englewood Cliffs, New Jersey, Nov. 1984.

Yin, N.; Hluchyj, M.G.; "*A dynamic rate control mechanism for integrated networks*", INFOCOM '91. Proceedings; Tenth Annual Joint Conference of the IEEE Computer and Communications Societies; Networking in the 90s; IEEE, 1991; pp.: 543-552 vol.2.

"Internet Architectures" by D. Minoli and A. Schmidt, published by John Wiley & Sons, New York, New York, 1999 (ISBN 0-471-19081-0), pp. 37-56.

* cited by examiner

FIG. 1

FIG. 1A
Voice Over DSL

CONTROLLING NETWORK CONGESTION USING A BIASED PACKET DISCARD POLICY FOR CONGESTION CONTROL AND ENCODED SESSION PACKETS: METHODS, SYSTEMS, AND PROGRAM PRODUCTS

RELATED APPLICATION

Copending Application Ser. No. 09/906,406 entitled CODEC WITH NETWORK CONGESTION DETECTION AND AUTOMATIC FALLBACK: METHODS, SYSTEMS & PROGRAM PRODUCTS, filed Jul. 16, 2001, and assigned to the same Assignee as that of the present invention and fully incorporated herein by reference.

BACKGROUND OF INVENTION

1. Field of Invention

This invention relates to communication network methods, systems and program products. More particularly, this invention relates to controlling network congestion using a biased packet discard policy for congestion control and encoded session packets: methods, systems, and program products

2. Description of Prior Art

Numerous different Speech Coder/Decoder techniques for compressing speech signals and recovering the original signals from the compressed data have been standardized by the International Telecommunications Union (ITU) (e.g., G.711, G.723.1, G.726, G.728, G.729A). There are many other codec techniques and algorithms which remain proprietary. Likewise, numerous codec algorithms (both standard and proprietary) have been applied to the compression of video signals. Various data codecs, such as compression, error correction, or encryption processors, could also be applied within the scope of this invention. The various codec algorithms typically provide a trade-off between implementation complexity (MIPs and Memory), bit rate required to support real-time sessions, and session quality. Thus one can typically choose a more complex algorithm to reduce the bit rate required to support a session, but in general the lower bit rate also typically results in lower quality session when passed through a coder/decoder pair. For instance lower bit rate connections for voice or video would typically result in lower quality speech or image signals as perceived by the user, while use of compressed data as opposed to uncompressed data might result in longer latency for a data session. Use of more effective error-correcting codes, with corresponding larger overhead could be applied to data sessions when excess bandwidth is available, potentially avoiding the need for retransmission of data received in error.

The codecs are typically useful in facilitating voice or video traffic within packet-based networks i.e., IP networks, including the Internet as well as private and virtual private networks. Compression functions are desirable since they reduce the load on the networks by reducing the bit rate required to support each session. A motivation for voice over packet networks is to reduce the cost of voice traffic (i.e., toll bypass), as well as to consolidate both voice and data onto a single network, thus reducing network management overhead. A second motivation of voice over packet technology is to connect a remote telephone into the Public Switched Telephone Network (PSTN) without using local phone service. Connecting a remote telephone into the PSTN is done by using a broadband link such as Asynchronous Digital Subscriber Line (ADSL) to carry the digitized voice from the subscriber's location through the local central office to a voice gateway. In either network configuration, the voice codec type is typically negotiated at the beginning of a voice session. Video over various packet networks is also highly desirable for video conferencing, distance learning, and video on demand applications.

ITU-T standard H.323 provides a protocol for two endpoints to negotiate the desired codec for a session. Once established, codec parameters are typically fixed for the duration of a session. Typical user preference would be to always use the codec that results in the best session quality. Unfortunately, if there is significant traffic (many voice or video sessions as well as many data sessions) on the network, the higher throughput required for the desired session quality can result in lost packets (for both voice/video and data traffic) in the network due to router decisions to discard packets as queues become too full. Lost voice (video) packets degrade the speech (image) quality of voice (video) sessions, and lost data traffic may even make congestion worse because of a need to retransmit discarded data. The desirability of adjusting speech codec bit-rate in response to congestion was pointed out in the text "Digital Coding of Waveforms: Principles and Applications to Speech and Video" by Nuggehally S. Jayant, P. Noll, by Prentice Hall, Engwood Cliffs, N.J., November 1990. However there was no discussion in this reference as to how one should determine when to alter the coder bit rate. A paper entitled "A dynamic rate control mechanism for integrated networks", Yin, N.; Hluchyj, M. G.; INFOCOM '91. Proceedings; Tenth Annual Joint Conference of the IEEE Computer and Communications Societies; Networking in the 90s; IEEE, 1991; Page(s): 543–552 vol. 2, discloses a technique whereby a network device could modify a packet header to indicate to the end nodes a congested network condition. However, the technique requires explicit packet modification within the network and would be difficult to implement on a widespread basis.

Accordingly, there is therefore a need to control the bandwidth consumed by sessions in a packet network in order to better control network congestion.

Other prior art related to packet network congestion control includes:

U.S. Pat. No. 6,081,504 entitled "Apparatus & Method for Cell Discard" issued Jun. 27, 2000, filed Mar. 19, 1993 discloses a cell-discard control apparatus that includes an encoding unit for encoding voice/image information in accordance with a prescribed coding scheme. An information-dividing unit divides the encoded data into basic information data and detail information data. A basic information cell-assembling unit assembles the basic information data into basic information cells. A detail information cell-assembling unit assembles the detail information data into detail information cells. A basic information-multiplexing unit multiplexes basic information of a plurality of channels for transmission. A detail information multiplexing unit multiplexes detail information of the plurality of channels for transmission. A cell output unit outputs the basic information multiplexed cell and the detail information multiplexed cell and preferentially discards the detail information multiplexed cell in the event of congestion.

U.S. Pat. No. 6,044,079 entitled "Statistical Packet Discard" issued Mar. 28, 2000, filed Oct. 3, 1997 discloses an apparatus that manages Packet-Discard at a switch in an ATM network. The apparatus includes a table having a number of table addresses (or indexes). Each table address stores a record for incoming data cells of a frame. The records indicate whether data cells of the frame are to be discarded. The number of possible cell identifiers is greater than the number of table addresses. The apparatus also includes a processor unit that receives a data cell having a cell identifier. The processor unit determines a table key based on the cell identifier such that the table key is within the range of the table addresses. The processor unit then searches a record in the table associated with the table key to determine whether the data cell is to be discarded.

U.S. Pat. No. 5,444,706 entitled "Packet Exchange Network and Method of Controlling Discard of Packets in Packet Exchange Network" issued Aug. 22, 1995, filed Dec. 26, 1990 discloses a packet exchange network comprises a plurality of packet exchange nodes connected through trunk lines and terminals connected to the packet exchange nodes each of which is provided a packet storage buffer for storing received packets. When the buffer cannot store every incoming packet due to "traffic congestion," some of the packets are discarded from the buffer by examining and registering the number of relay packet exchange nodes through which the packet passes during the communication at the time of setting a call to start a packet communication and by positively changing a discard rate of packets to be discarded at each relay packet exchange node on the basis of the registered packet exchange node number, so that all the packets have substantially the same discard rate regardless of the relay packet exchange node number.

U.S. Pat. No. 5,253,326 entitled "Prioritization Method and Device for Speech Frames Coded by a Linear Predictive Coder" issued Oct. 12, 1993, filed Nov. 26, 1991 discloses a priority assignment method and device set forth for assigning a priority to a selected speech frame coded by a linear predictive coder based on at least two of: energy of the speech frame, a log spectral distance between a frame and a frame immediately previous, and a pitch predictor coefficient for the selected speech frame. The invention protects against loss of perceptually important and hard-to-reconstruct speech frames. .

U.S. Pat. No. 5,231,633 entitled "Method for Prioritizing, Selectively Discarding, and Multiplexing Different Traffic Type Passed Packets" issued Jul. 27, 1993, filed Jul. 11, 1990 discloses a queuing and dequeing mechanism for use in an integrated fast packet network, wherein fast packets from differing traffic types are multiplexed with one another through use of a weighted round-robin bandwidth allocation mechanism (517). Fast packets within a particular traffic type are selected for transmission through use of a head of line priority service (514), a packet discard mechanism (516), or both. The weighted round-robin bandwidth allocation mechanism functions in part, based upon a credit counter for each queue group that represents a particular traffic type.

None of the prior art discloses a network processing system capable of allowing congestion control packets to flow through the Network; classifying packets flowing through the network as congestion control, encoded packets (i.e. voice, video, compressed data, etc.) or data packets, and a biased packet discard policy which favors discarding congestion control packets followed by voice or video packets rather than data packets when an associated flow control mechanism forces some number of packets to be discarded in response to network congestion.

SUMMARY OF INVENTION

An object of the invention is a packet network with improved congestion control.

Another object is a network congestion control method, system, and program product that provides congestion control signals as heartbeat signals for detection of congestion in the network.

Another object is a network congestion control method, system and program product using a biased signal discard policy to reduce or increase bit rate required to support associated voice, video and data sessions resulting in a reduction in network congestion or improved speech or video quality.

Another object is a packet network congestion control method, system and program product that allow congestion control packets to flow through the network only when flow control mechanisms indicate there is no longer a concern regarding network congestion.

Another object is a packet network congestion control method, system and program product which detects congestion control packets and discards them during periods of or trends toward network congestion in voice, video, and data sessions thereby stimulating codecs to renegotiate the type of compression algorithm used to reduce congestion.

Another object is a packet network congestion control method, system and program product classifying packets containing encoded session content (i.e. voice, video) in order to identify sessions capable of renegotiating codec type to reduce required bit rate to control congestion.

Another object is a packet network congestion control method, system and program product which delays the resumption of flow of congestion control packets to minimize thrashing between two codec types and track long-term trends of network congestion.

Another object is a packet network congestion control method, system and program product which increases the bit rate available to support associated voice, video and data sessions when excess bandwidth is available resulting in an increase in speech quality for associated voice sessions.

These and other features and advantages, in one embodiment, are achieved in a packet network into which congestion control packets are inserted into sessions consisting of encoded packets conducted by terminals or end points wherein the packet network classifies packets flowing through the network. When an associated flow-control mechanism detects network congestion or a trend toward network congestion, the mechanism discards congestion control packets rather than voice, video, and data packets, stimulating the end-point devices to reduce bit rate using a call establishment and control protocol such as ITU-T H.323 protocol. In the absence of congestion control packets or in cases of severe network congestion, voice and video packets may also be discarded in order to protect data packets. The network includes a plurality of terminals or end points having voice codecs, video codecs and various other endpoint devices using the framework such as ITU-T H.323 protocol to establish a communication session. Each codec is configured in accordance with a previously negotiated Service Level Agreement (SLA) with the operator of the network. In the absence of network congestion, codecs select the codec type or bit-rate with the highest speech or video quality (typically also the highest bit rate, but lowest implementation complexity) from among the set of codec types commonly supported between the two devices. Once the connection and session are established, compressed voice, compressed video, and data packets start flowing between the two end points. The H.323 protocol becomes a background process available for renegotiation or session termination, but not actively processing the speech and video packets. A control entity associated with the codec at each end point supplies congestion control packets periodically. The control packets are short, since they contain no data and are not sent very often. The purpose of the control packets is to provide a "heartbeat" signal to the codec at the other end of the session. Each codec receiver uses the absence of the "heartbeat" signal as an indication of network congestion. When the network is not congested, all heartbeat packets are passed through. However, as network congestion increases, routers within the network are forced to discard excess packets to prevent catastrophic network failure. Accordingly, the network processing system discards all packets classified as congestion control packets whenever the flow control mechanism detects congestion or a trend toward congestion. In the absence of congestion control packets or in cases of severe network congestion, voice and video packets may also be discarded in order to protect data packets. As packets are discarded, the end points detecting the absence of these discarded packets are stimulated to renegotiate speech codec type and/or parameters to realize lower bit rates. When network congestion is no longer a problem, the flow of congestion control packets is permitted through the network, stimulating the codecs to renegotiate the speech codec type back to a higher bit rate. The network may continue to discard congestion control packets for some time after congestion has subsided to prevent thrashing of bandwidth utilization. In operation, a packet flow control process in a first operation receives and classifies the characteristic of the packet. After classification, a second operation determines whether or not the network is congested using some type of flow control such as Random Early Detection (RED), sometimes referred to as Random Early Discard, which controls congestion at least within the network processing system by discarding packets. If the network is not congested, normal processing of the packets transporting speech and video occurs. However, if network congestion is detected, the packet is examined to determine whether or not the packet is a congestion control packet. Only if the packet is one of the congestion control packets will the processing system discard the packet in the presence of congestion. Otherwise, normal processing of the packet occurs unless excessive network congestion is present. In this case, both congestion control and encoded (speech and video) packets are discarded resulting in a faster response by the codecs to reduce bit rates, after which the process waits to receive the next packet. The codecs use a slowdown threshold and a speedup threshold for renegotiating bit rates. Thresholds may be varied according to the time interval for checking error count of missing packets in responding to congestion.

DESCRIPTION OF DRAWING

The invention will be further understood from a detailed description of a preferred embodiment taken in conjunction with an appended drawing, in which.

DETAILED DESCRIPTION OF A PREFERRED EMBODIMENT

Figure 1:
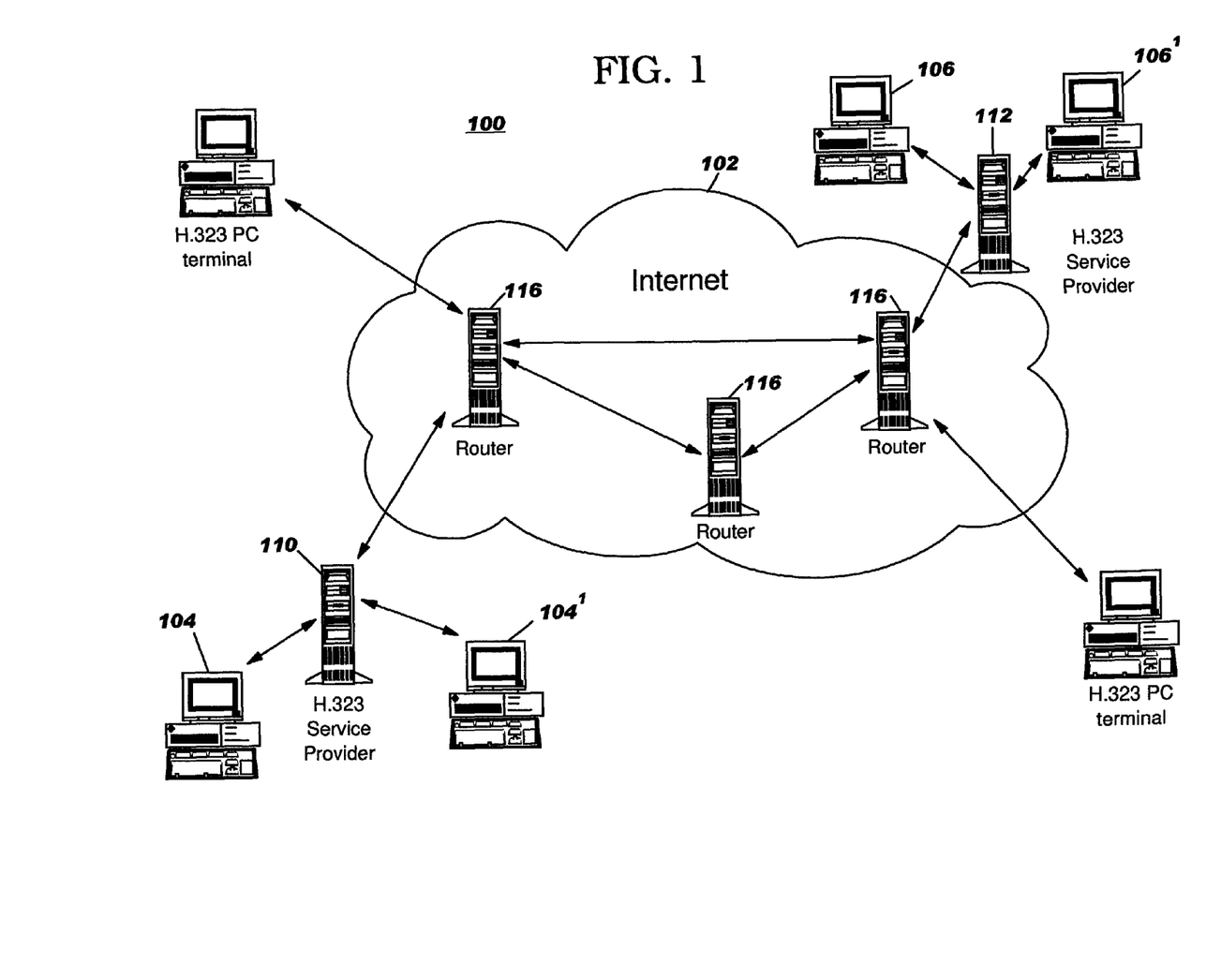
FIG. 1 is a representation of a packet network incorporating the principles of the present invention for voice, video, and data transmission between two or more client stations as elements within the network selectively discarding packets in response to network congestion and interacting codecs executing software applications for detecting the absence of discarded packets, adjusting codec bit rate in response to the detection of discarded packets, to support speech, video, and data sessions otherwise significantly impaired.

In FIG. 1, a network congestion detection and automatic correction system 100 for a packet network 102, typically the internet or private network, provides improved speech, video, and data transmissions to terminals or end points 104 and 106. The terminals are connected to the Internet via Internet Service Providers (ISP) 110 and 112, respectively. Other networks require similar access points. The service providers are in turn linked to routers 116 within the network 102 for directing the calls and data between the terminals 104 and 106. The operation of the internet for initiating and routing calls between terminals is well known and described, for example, in the text "Internet Architectures" by D. Minoli and A. Schmidt, published by John Wiley & Sons, New York, N.Y., 1998(ISBN 0-471-19081-0) which is fully incorporated herein y reference.

Terminals 104, 106 and the service providers 110, 112 function according to the framework of International Telecommunications Union (ITU) H.323 Standard for audio, video and data communications across packet networks including the Internet. Alternately, H.323 enabled terminals 108, 109, are connected to the network via service providers that may not support H.323 functions. However, these terminals may establish H323 sessions with other H.323—enabled terminals. H.323 allows multi-media products and applications from multiple vendors to inter-operate without concern for compatibility. H.323 covers a selection of audio and video codecs, shared applications, call control, and system control. H.323 includes ITU H.245 which is used to negotiate capabilities under control aspects of the conference between two or more end points. Details of H.323 are described in the International Telecommunications Union (YFU) specifications.

The terminals include coder/decoder techniques for compressing speech, video, or data signals and recovering the original signals from compressed data. The speech compression and decompression techniques have been standardized by the ITU, e.g., G.711, G.723.1, G.726, G.728, G.729A.

Figure 1A:
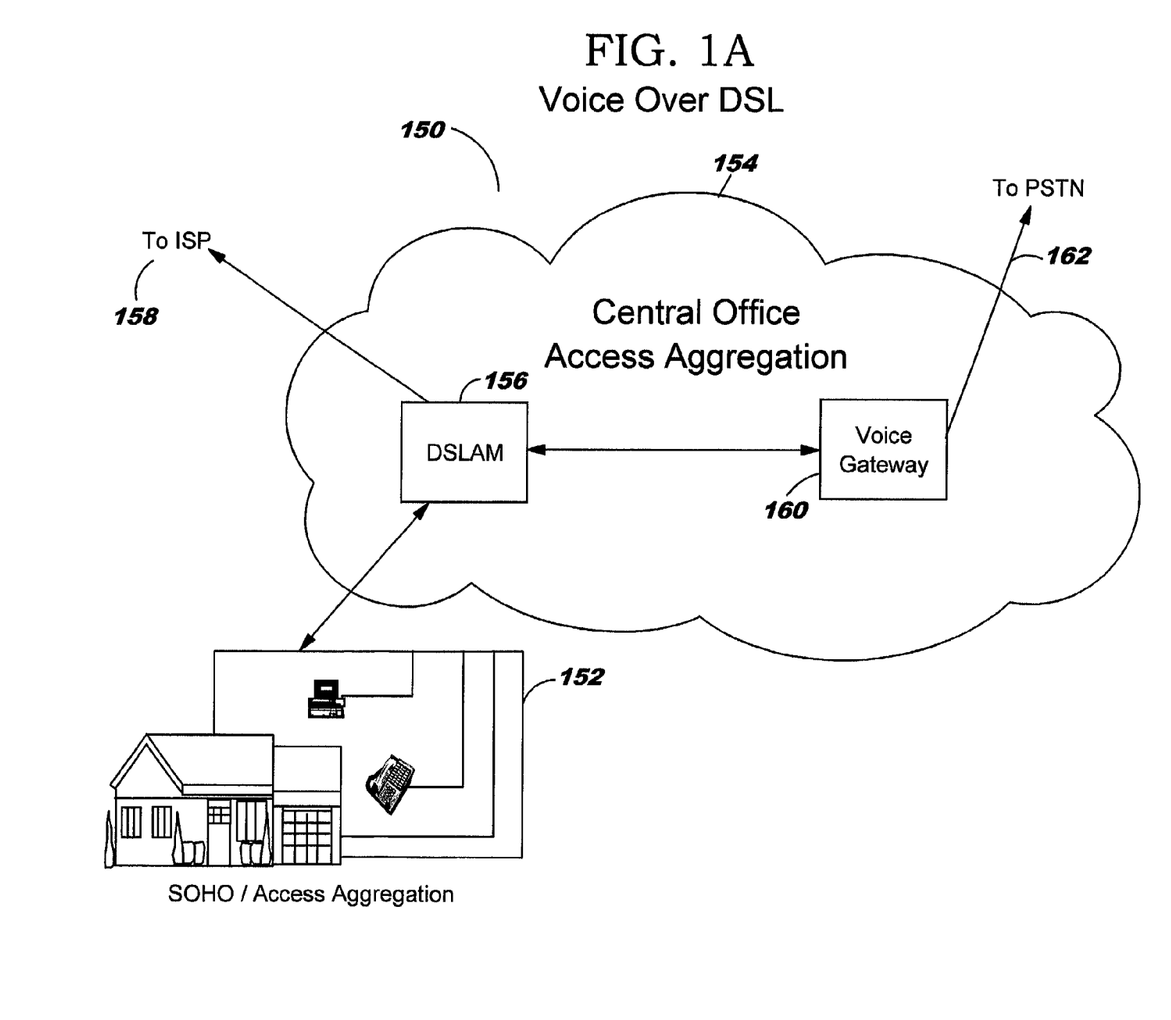
FIG. 1A is an alternative embodiment of FIG. 1.

In an alternative embodiment, a network congestion detection system 150 is shown in FIG. 1A. A terminal 152 is connected to a central office access aggregation 154 via a Digital Subscriber Line Access Multiplexer (DSLAM) 156 or other remote access technology (i.e. cable modem, wireless). The multiplexer is linked to an Internet Service Provider (ISP) 158 for digital communication and interacts with a voice gateway 160 for voice communications to a Pubic Switch Telephone Network (PSTN) 162. System 150 automatically detects network congestion and corrects for congestion in the same manner as will now be described for the packet network shown in FIG. 1.

Returning to FIG. 1, a speech, video, or data session is set up between two terminals, e.g., 104, 106, executing compression/decompression algorithms, e.g., G.723, as voice codecs. The codecs compress and packetize the speech which is transmitted over the network using "UDP" protocol at the transport layer. One of the two codecs may be a voice gateway device 160 within the network as shown in FIG. 1A providing a means for the terminal at the other end to access the PSTN. Each of the codecs must be configured in accordance with a previously negotiated Service Level Agreement (SLA) with the operator of the network. The SLA defines, among other things, a preferred codec type and a guaranteed minimum bit rate (minimum session quality) codec type.

The terminals and the service providers 110, 112 execute software implementing the H.323 protocol which manages call signaling for two or more end points engaged in a session. The H.323 protocol defines procedures for two voice codec devices to negotiate a commonly agreed to codec type.

In the absence of significant network congestion, the terminals select the codec type with the highest session quality (typically also the highest bit rate, but lowest implementation complexity) from among the set of codec types which can be commonly supported between the two devices. At least two different codec types or two different bit rate modes within the same codec type must be commonly supported between the two terminal devices. It is preferable to select multiple bit rates within the same codec type in order to minimize the transient effects of switching from one bit rate to another. A particular response time advantage for switching rates can be achieved if the codec type includes an embedded bit stream with predetermined priorities associated with different groups of bits within a packet. When using such a codec type, a lower bit rate may be achieved without negotiating with the other end by simply dropping the lower priority bits in the encoding process, thus creating a smaller packet to send during each interval. The receiving decoder will automatically recognize that the received packet has less than the expected amount of data and since the priorities of the group of bits are predetermined, the decoder knows which bits were not sent, and knows how to recreate a lower quality speech signal with the bits received without having to negotiate the lower bit rate. The receiving decoder may optionally signal the co-located encoder to reduce the bit rate in the opposite direction by the same amount in order to better deal with the network congestion which was originally detected in that direction.

Once the connection is established between terminals 104, 106 and compressed encoded session packets start flowing over the "UDT" transport layer, H.323 control software typically becomes a background process, available for renegotiations or session termination but not actively processing the encoded packets. However, the H.323 control entity will send and receive network congestion control packets periodically using the "TCP" transport layer which has a larger header containing sequence numbers usable for flow control and detection of missing packets. The congestion control packets may, or may not use different layer 4 port numbers and, may or may not share port numbers with the H.323 session. The congestion control packets are short, since they contain no data, and are not sent very often (either one for every N encoded packets sent, or alternately, one for every M milliseconds in time). The sole purpose of the network congestion control packets is to provide a "heartbeat" indication to the codec at the other end of the session. Each codec receiver may use the absence of "heartbeat" packets from the other codec as an indication of network congestion. When a network is not congested, all "heartbeat" packets will be passed through. However, as network congestion increases, the routers 116 within the network are forced to discard excess packets in order to prevent catastrophic network failure.

A network in accordance with the present invention controls network congestion by recognizing "heartbeat" packets and discarding all packets classified as congestion control packets whenever a control mechanism detects congestion or a trend toward congestion, thereby stimulating any corresponding sessions to renegotiate codec type and/or parameters to realize lower bit rates for those sessions. Likewise, when network congestion is no longer a problem, the congestion control packets will be allowed to flow through the network, thus enabling the end user codec devices to renegotiate codec type again, this time back to a higher bit rate with corresponding higher session quality.

In the absence of detecting and manipulating congestion control packets, the codec devices in accordance with co-pending application Ser. No. 09/906,406 entitled "CODEC WITH NETWORK CONGESTION DETECTION AND AUTOMATIC FALLBACK: METHODS, SYSTEMS & PROGRAM PRODUCTS", filed Jul. 16, 2001, and fully incorporated herein by reference dynamically respond to lost packets (either congestion control packets or normal encoded packets) in order to minimize network congestion. The advantage of working with codec devices described in the related application is that discarding packets can be focused specifically on packets which do not carry meaningful voice, image, or data and will stimulate these codec devices to reduce bit-rate requirements, and thus, do not corrupt current session quality nor require data retransmission.

Alternatively, a network node can also stimulate end points to rapidly reduce codec bit rate by discarding both encoded packets and congestion control packets. The network can also explicitly delay restoring the flow of congestion control packets once encoded packets are flowing again to ensure codecs do not attempt to speed up to soon causing a reoccurrence of the network congestion.

Figure 2:
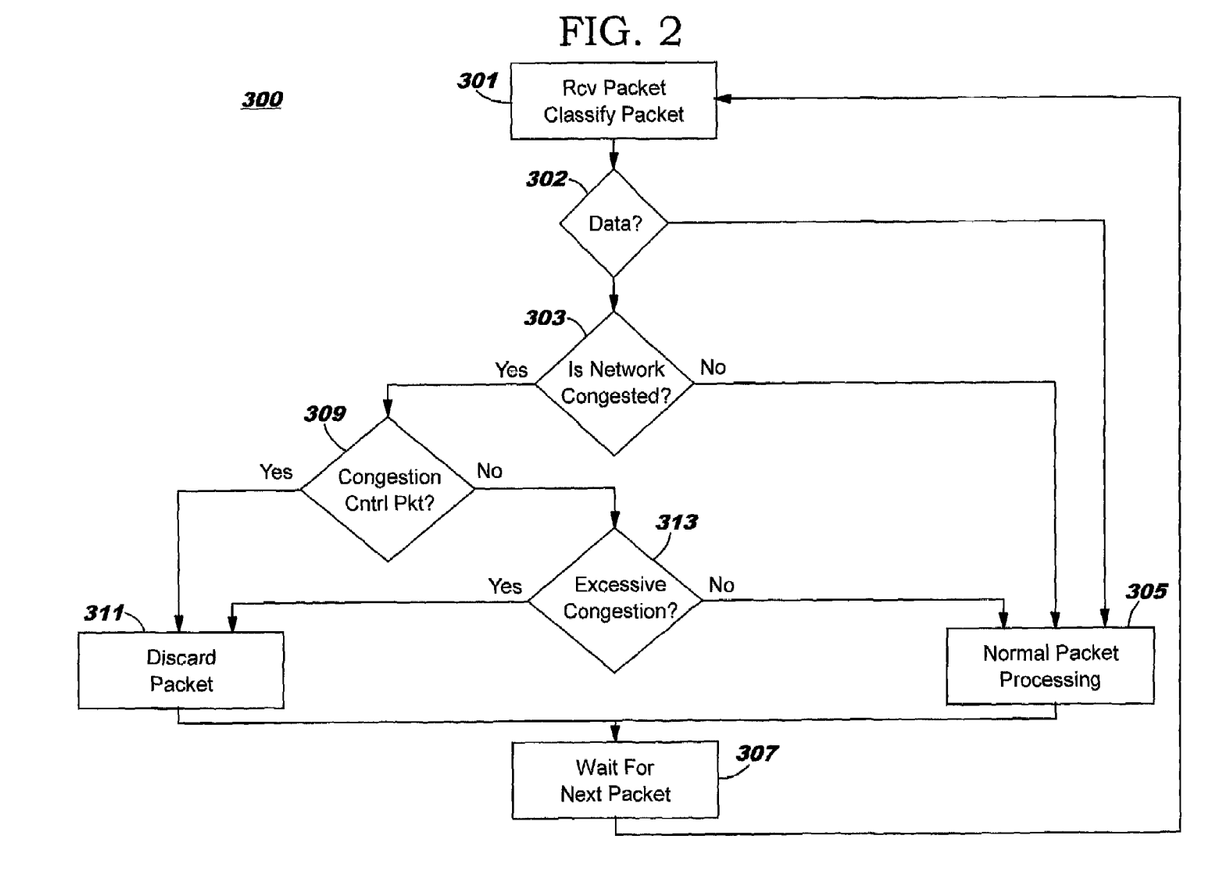
FIG. 2 is a flow diagram implementing the detection of network congestion and discarding selected packets in order to stimulate the endpoint devices to adjust the bit rate used to support associated speech, video, and data sessions in FIG. 1.

FIG. 2 illustrates a packet network control process 300 that controls network congestion by recognizing "heartbeat" packets and discarding all packets classified as congestion control packets whenever a flow control mechanism detects congestion or a trend towards congestion. The flow chart represents a loop that is passed through once for each packet received and classified in block 301. Each congestion control, voice, video or data packet includes a header containing coding which is detected by conventional apparatus for classifying the packet. After packet classification, data packets are detected in block 302 and are always sent to block 305 for normal packet processing. Each time a congestion control, voice or video packet is received, a decision block 303 determines whether or not the network is congested using a Random Early Detection (RED) process described in Ser. No. 09/448,190, entitled "Method and system for providing optimal discard fraction ", filed Nov. 23, 1999 and Ser. No. 09/448,380, entitled "Method and system for controlling transmission of packets in computer networks," filed Nov. 23, 1999, both assigned to the Assignee of the present invention and fully incorporated herein by reference. If the network is not congested, normal packet processing for forwarding the packet to its intended destination is performed in block 305, after which the process waits for the next packet in block 307.

If block 303 determines the network is congested, a decision block 309 makes a determination whether or not the encoded session packet currently being processed is a congestion control packet. Only if the packet is a congestion control packet will the process discard the packet in block 311 and proceed to block 307 to await the next packet for processing. The discarding of the congestion control packets has very little impact on the overall network traffic since the packets represent a very small portion of the packet flow. The network action of discarding network congestion control packets is detected by the intended receiving node via the absence of an expected packet. This event is communicated to the sending node which initiates renegotiation of codec type with its associated reduction in bit rate under the H.323 protocol. Alternately, if codec bit-rates are required to be equal in both directions, the receiving node can directly initiate the renegotiation.

If block 309 determines the packet is not a congestion control packet, the process transfers to block 313 that determines whether or not excessive congestion is present in the network. Determination of network congestion may be made by routers 116 within the network via examination of various queues, buffers, and other storage devices within routers 116 in order to identify any such resources that are approaching their maximum capacity. Thresholds for identifying congestion, as well as severe congestion, are highly dependent on storage capacity, sampling intervals, response times, and other specific characteristics of individual routers 116. If excessive congestion is not detected in block 313, normal packet processing occurs in block 309, after which the process transfers to block 307 to wait for the next packet. If excessive congestion is detected in block 313, the process proceeds to discard voice packets (and/or video packets in alternate embodiments) until the excessive congestion is corrected by the sending and receiving end points renegotiating each coder type and associated bit rate. When the process detects the network congestion is no longer a problem, the process allows the congestion control packets to flow through the network enabling the sending and receiving codec devices to renegotiate codec type again—this time to higher bit rate with corresponding higher session content quality. The codec devices can always dynamically respond to lost packets, either congestion control packets or normal encoded packets, in order to minimize network congestion by renegotiating codec type and bit rate.

By a biased discard policy of congestion control packets as a first step or voice and/or video packets as a second step in the reduction of congestion, the discard of congestion control packets which do not carry meaningful data or voice, avoids corruption of current voice quality as well as required data retransmission in data sessions which would increase network congestion. The network node can also stimulate the end points to rapidly reduce codec bit rate by discarding both encoded session content and congestion control packets and still explicitly delay restoring the flow of congestion control packets when encoded packets are flowing again to ensure that codecs don't attempt to speed up too soon causing a reoccurrence of the network congestion. Summarizing, the packet network of the present invention discards certain "heartbeat" or congestion control packets to signal the existence of congestion within the network. Once the discard of the congestion control packets is detected, the receiving node communicates the event to the other node and renegotiations of speech coder type and bit rate is initiated using the H.323 protocol. The network also discards actual encoded packets during severe congestion and the receiving node also communicates this fact to the sending node that some encoded packets are missing in the flow which initiates the renegotiations of codec type and bit rate. Once congestion has been alleviated, the process uses the H.323 protocol to increase the bit rate after which the flow of "heartbeat" packets is reestablished. Further, in place of simply controlling flow rates by discarding some fraction of traffic, the flow rates per session can be reduced by changing the codec type or bit-rate which controls network congestion at the source by reducing offered traffic loads of current sessions.

While the invention has been described in a preferred embodiment various changes may be made without departing from the spirit and scope of the invention as defined in the appended claims, in which

We claim:

1. A packet network congestion control system using a biased packet discard policy, comprising:
   a plurality of end points or terminals connected to the network, each end point including a codec; connecting apparatus, which connects at least two end points in a packet communication session using call control protocol for negotiating codec type and highest session quality;
   network congestion generator which generates network congestion control packets periodically as heartbeat signals for the receiving codec as an indication of network congestion;
   packet flow control apparatus which detects the presence of congestion in the network; and
   network processing apparatus which selectively discard packets in the presence of network congestion for improved communications in the session.

2. The network congestion control apparatus of claim 1 further comprising:
   packet generation apparatus at the end points which generates voice, video and/or data packets for the communication session.

3. The network congestion control apparatus of claim 1 further comprising:
   network congestion control packet generation apparatus which generates and includes congestion control packets in the communication session.

4. The network congestion control apparatus of claim 1 further comprising:
   packet classifying apparatus which processes and classifies packets in the communication session.

5. The network congestion control apparatus of claim 1 further comprising:
   congestion control packet detection apparatus which determines the presence or level of network congestion control packets in a communication session.

6. The network congestion control system of claim 1 further comprising: packet discard apparatus which discards congestion control packets in the presence of network congestion and initiates reduction in the bit rate and codec type at the end points using call control protocol resulting in improved communication for the session.

7. A packet network congestion control system using a biased packet discard policy, comprising:
   a plurality of end points or terminals connected to the network, each end point including a codec;
   connecting apparatus, which connects at least two end points in a packet communication session using call control protocol for negotiating codec type and highest session quality;
   packet flow control apparatus which detects the presence of congestion in the network;
   network processing apparatus which selectively discard packets in the presence of network congestion for improved communications in the session; and excessive network congestion detection apparatus which discards encoded session packets and congestion control packets to stimulate the end points to rapidly re-negotiate bit rate and speech coder type for the communication session.

8. The network congestion control system of claim 1 further comprising:
   end point control apparatus which changes codec compression in lieu of discarding packets to control congestion.

9. The network congestion control system of claim 1 further comprising:
data packet detection apparatus which detects and processes data packets independent of network congestion.

10. A packet network congestion control system using a biased packet discard policy, comprising:
a plurality of end points or terminals connected to the network, each end point including a codec;
connecting apparatus, which connects at least two end points in a packet communication session using call control protocol for negotiating codec type and highest session quality;
packet flow control apparatus which detects the presence of congestion in the network;
network processing apparatus which selectively discard packets in the presence of network congestion for improved communications in the session; and
packet delaying apparatus which delays the restoring of network congestion control packets once encoded session packets are flowing to prevent a re-occurrence of network congestion.

11. A packet network congestion control system using a biased packet discard policy, comprising:
a plurality of end points or terminals connected to the network, each end point including a codec;
connecting apparatus, which connects at least two end points in a packet communication session using call control protocol for negotiating codec type and highest session quality;
generator which generates and includes network congestion control packets in a communication session;
packet flow control apparatus which detects the presence of congestion in the network; and
network processing apparatus which selectively discard packets in the presence of network congestion for improved communications in the session wherein the network congestion control packets are of short duration, contain no data and represent a small portion of total bandwidth.

12. A packet network congestion control system using a biased packet discard policy, comprising:
a plurality of end points or terminals connected to the network, each end point including a codec; connecting apparatus, which connects at least two end points in a packet communication session using call control protocol for negotiating codec type and highest session quality;
generator which generates network congestion control packets;
packet flow control apparatus which detects the presence of congestion in the network; and
network processing apparatus which selectively discard packets in the presence of network congestion for improved communications in the session wherein the network congestion control packets are transmitted by a control entity in the absence of a selected level of network congestion.

13. A method of network congestion control using a biased packet discard policy, comprising the steps of:
establishing a communication session between two end points or terminals connected to a network, each end point including a codec;
negotiating the network bit rate and codec policy for the codecs;
generating network congestion control packets periodically as heartbeat signals for the receiving codec as an indication of network congestion using call control protocol; and
discarding congestion control packets in the presence of network congestion.

14. The method of claim 13 further comprising the step of: generating voice, video and/or data packets for the communication session.

15. The method of claim 13 further comprising the step of: generating and including congestion control packets in the communication session.

16. The method of claim 13 further comprising the step of: classifying and processing packets in the communication session.

17. The method of claim 13 further comprising the step of: determining the presence or level of network congestion control packets in a communication session.

18. The method of claim 13 further comprising the step of:
discarding congestion control packets in the presence of network congestion and initiating a reduction in the bit rate and codec type at the end points using call control protocol resulting in improved voice communication for the session.

19. The method of claim 13 further comprising the step of: discarding voice, video and congestion control packets to stimulate the end points to rapidly re-negotiate bit rate and codec type for the communication session.

20. The method of claim 13 further comprising the step of:
changing codec compression at the end points in lieu of discarding packets to control congestion.

21. The method of claim 13 further comprising the step of: detecting and processing data packets independent of network congestion.

22. The method of claim 13 further comprising the step of:
delaying the restoring of network congestion control packets once encoded session packets are flowing to prevent a re-occurrence of network congestion.

23. The method of claim 13 further comprising the step of: determining the presence of excessive congestion on the network and discarding encoded session packets to improve the speech codec response to reduce bit rate.

24. The method of claim 13 wherein the network congestion control packets are of short duration, contain no data and are generated intermittently.

25. The method of claim 13 wherein the network congestion control packets are transmitted by a control entity in the absence of a selected level of network congestion.

26. A network processing system for VoIP or DSL transmission of voice, video and data packets comprising:
apparatus which establishes a communication session between at least two end points, each end point including a codec;
apparatus classifying packets flowing through the network as encoded packets;
apparatus generating congestion control packets periodically as heartbeat signals for the receiving codec as an indication of network congestion;
apparatus detecting network congestion; and
biasing packet discard apparatus which discards voice packets rather than data packets in response to network congestion.

27. A network processing system for VoIP or DSL transmission of voice, video and data packets comprising:
apparatus which establishes a communication session between at least two end points, each end point including a codec;

apparatus classifying packets flowing through the network as encoded packets;
apparatus generating congestion control packets;
apparatus detecting network congestion;
biasing packet discard apparatus which discards voice packets rather than data packets in response to network congestion; and
apparatus which classifies encoded packets in order to identify sessions capable of renegotiating codec type to reduce required bit rate on the network.

28. A network processing system for VoIP or DSL transmission of voice, video and data packets comprising:
apparatus which establishes a communication session between at least two end points, each end point including a codec;
apparatus classifying packets flowing through the network as encoded packets;
apparatus generating congestion control packets;
apparatus detecting network congestion;
biasing packet discard apparatus which discards voice packets rather than data packets in response to network congestion;
apparatus which detects congestion control packets and discard them during periods of or trends toward network congestion; and
apparatus renegotiating a compression algorithm used by the codec in order to reduce the bit rate required to support an associated session.

29. A network processing system for VoIP or DSL transmission of voice, video and data packets comprising:
apparatus which establishes a communication session between at least two end points, each end point including a codec;
apparatus classifying packets flowing through the network as encoded packets;
apparatus generating congestion control packets;
apparatus detecting network congestion;
biasing packet discard apparatus which discards voice packets rather than data packets in response to network congestion; and
apparatus which allows congestion control packets to flow through the network only when a packet flow control mechanisms indicate that there is no longer a concern regarding network congestion.

30. A network processing system for VoIP or DSL transmission of voice, video and data packets comprising:
apparatus which establishes a communication session between at least two end points, each end point including a codec;
apparatus classifying packets flowing through the network as encoded packets;
apparatus generating congestion control packets;
apparatus detecting network congestion;
biasing packet discard apparatus which discards voice packets rather than data packets in response to network congestion; and
apparatus delaying the resumption of flow of congestion control packets to minimize thrashing between two codec types and facilitating tracking of long-term trends of network congestion.

31. A program medium, executable on a computer system for network congestion control using a biased packet discard policy, comprising:
program instructions for establishing a session between two end points or terminals connected to a network, each including a codec;
program instructions for negotiating the network bit rate and codec policy for the codecs using call control protocol;
program instructions for generating network congestion control packets periodically as heartbeat signals for the receiving codec as an indication of network congestion; and
program instructions discarding encoded packets rather than data packets in response to network congestion.

32. The medium of claim 31 further comprising: program instructions for discarding congestion control packets in the presence of network congestion.

33. The medium of claim 31 further comprising:
program instructions for determining the presence of excessive congestion on the network and discarding voice packets to improve the speech codec response to reduce bit rate.

34. The medium of claim 31 further comprising:
program instructions for delaying the restoring of network congestion control packets once encoded packets are flowing to prevent a re-occurrence of network congestion.

35. The medium of claim 31 further comprising: program instructions for intermittently generating network congestion control packets of short duration and without data.

36. The system or network or method or program medium of claims 1 or 13 or 31 respectively; wherein the call control protocol is ITU H.323.

* * * * *